US010926696B2

(12) United States Patent
Morimura

(10) Patent No.: US 10,926,696 B2
(45) Date of Patent: Feb. 23, 2021

(54) OUT-OF-VEHICLE NOTIFICATION DEVICE

(71) Applicant: TOYOTA JIDOSHA KABUSHIKI KAISHA, Aichi (JP)

(72) Inventor: Junichi Morimura, Sunto-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/827,178

(22) Filed: Mar. 23, 2020

(65) Prior Publication Data
US 2020/0215967 A1 Jul. 9, 2020

Related U.S. Application Data

(63) Continuation of application No. 16/382,459, filed on Apr. 12, 2019, now Pat. No. 10,640,035.

(30) Foreign Application Priority Data

May 8, 2018 (JP) .............................. JP2018-089832

(51) Int. Cl.
*B60Q 1/22* (2006.01)
*B60Q 1/50* (2006.01)
(Continued)

(52) U.S. Cl.
CPC .............. *B60Q 1/50* (2013.01); *G05D 1/021* (2013.01); *G08G 1/01* (2013.01); *G05D 2201/0213* (2013.01)

(58) Field of Classification Search
CPC .......... B60Q 1/50; B60Q 5/006; B60Q 1/503; B60Q 1/525; G05D 1/0223
See application file for complete search history.

(56) References Cited

U.S. PATENT DOCUMENTS 10,261,513 B2    4/2019   Reiley et al.
10,467,903 B1*  11/2019   Chase .................. B60W 30/12
(Continued)

FOREIGN PATENT DOCUMENTS

GB        2531084 A       4/2016

OTHER PUBLICATIONS

Communication dated Jul. 13, 2020, issued by the U.S. Patent and Trademark Office in U.S. Appl. No. 16/385,662.
(Continued)

*Primary Examiner* — Toan N Pham
(74) *Attorney, Agent, or Firm* — Sughrue Mion, PLLC

(57) ABSTRACT

An out-of-vehicle notification device notifies a moving person in a vicinity of a host vehicle of information related to a behavior of the host vehicle while the host vehicle is being automatically driven. The out-of-vehicle notification device includes a moving person detecting unit configured to detect the moving person who is to be notified, an approaching vehicle detecting unit configured to detect an approaching vehicle approaching the moving person to be notified, a notification unit configured to perform notification of information with respect to an outside of the host vehicle, and a notification control unit configured to cause the notification unit to perform notification of vehicle stoppage information, which indicates that the host vehicle will be decelerated, when the moving person to be notified is detected and a traveling plan is a traveling plan in which the host vehicle is decelerated.

4 Claims, 5 Drawing Sheets

(51) Int. Cl.
    *G08G 1/01*        (2006.01)
    *G05D 1/02*        (2020.01)

(56) References Cited

U.S. PATENT DOCUMENTS

| | | |
|---|---|---|
| 2011/0234422 A1 | 9/2011 | Yamashita |
| 2014/0062685 A1 | 3/2014 | Tamatsu et al. |
| 2015/0258928 A1 | 9/2015 | Goto et al. |
| 2018/0173237 A1 | 6/2018 | Reiley et al. |
| 2018/0276986 A1 | 9/2018 | Delp |
| 2019/0168664 A1 | 6/2019 | Tatara et al. |

OTHER PUBLICATIONS

Communication dated Nov. 13, 2020, issued by the U.S. Patent and Trademark Office in U.S. Appl. No. 16/385,662.

* cited by examiner

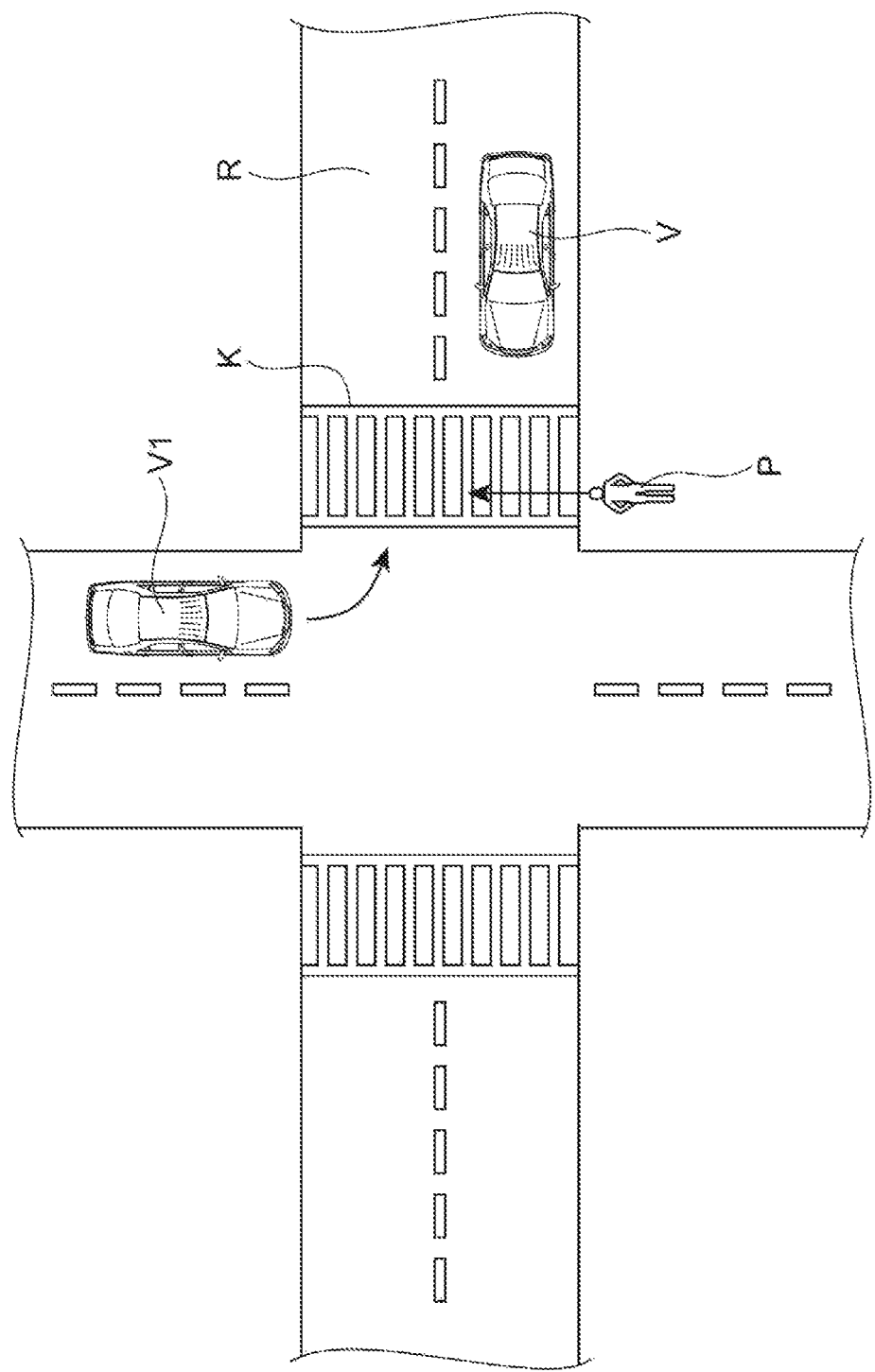

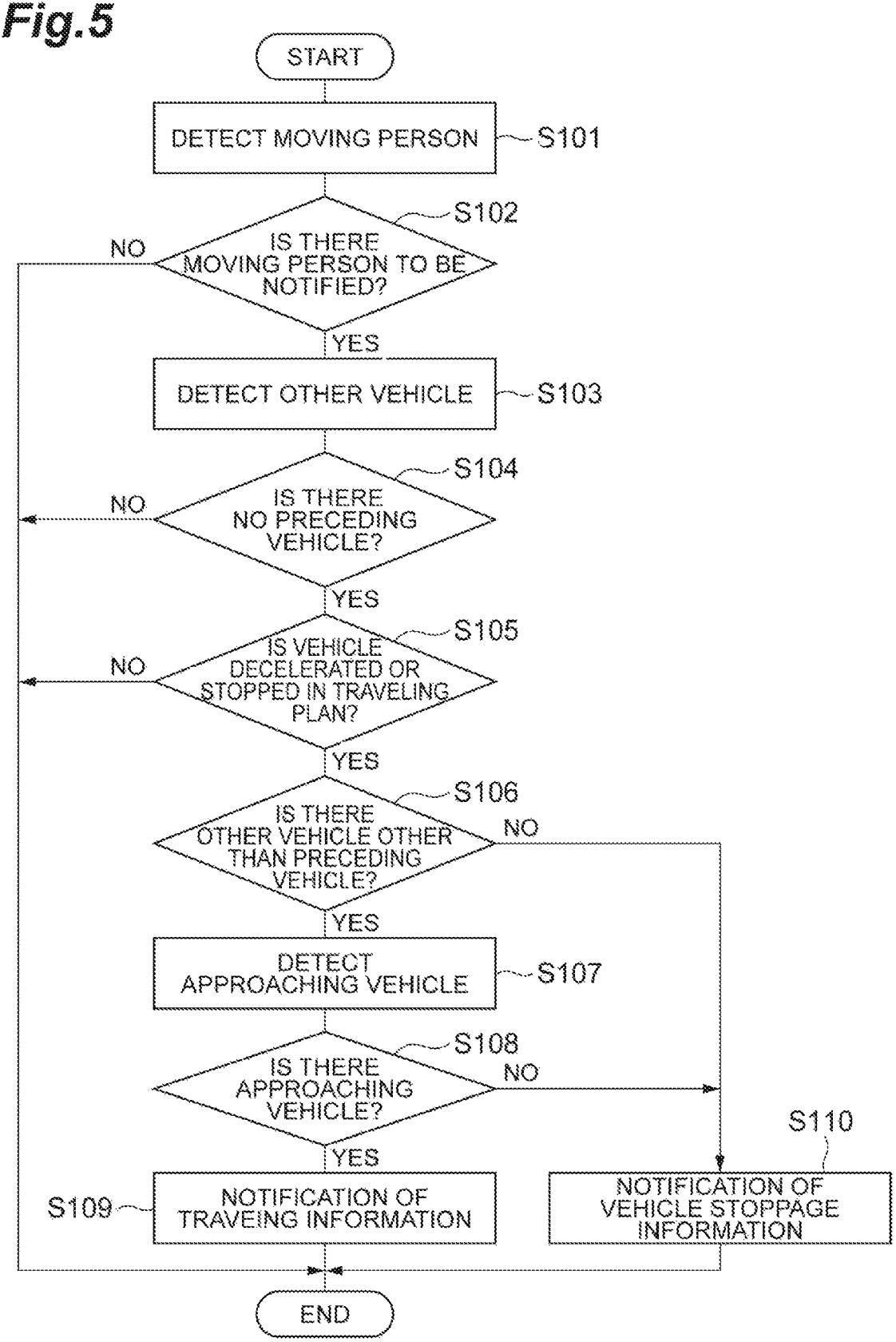

OUT-OF-VEHICLE NOTIFICATION DEVICE

CROSS-REFERENCE TO RELATED APPLICATION

This application is a continuation of U.S. application Ser. No. 16/382,459 filed Apr. 12, 2019, now U.S. Pat. No. 10,640,035, which claims the benefit of priority from Japanese Patent Application No. 2018-089832, filed on May 8, 2018. The entire disclosures of the prior applications are considered part of the disclosure of the accompanying continuation application, and are hereby incorporated herein by reference in its entirety.

TECHNICAL FIELD

The present disclosure relates to an out-of-vehicle notification device that performs notification with respect to the outside of a vehicle.

BACKGROUND

A device that provides information related to traveling of a host vehicle to a nearby pedestrian from the host vehicle while the host vehicle is being automatically driven is described in specification of UK Unexamined Patent Publication No. 2531084. The device provides information or the like on whether to make way for the pedestrian or not to the pedestrian using light, voice, or the like, for example. Accordingly, the pedestrian can act according to the notification.

SUMMARY

The device described in specification of UK Unexamined Patent Publication No. 2531084 notifies the pedestrian of information related to the behavior of the host vehicle but the device does not perform notification in consideration of the behavior of another vehicle. Therefore, the other vehicle may approach the pedestrian who starts to move according to the notification performed by the device which indicates an intention to make way for the pedestrian. Accordingly, in this technical field, it is desired to perform appropriate notification of information related to the behavior of a host vehicle in consideration of the presence of another vehicle.

An out-of-vehicle notification device according to an aspect of the present disclosure is an out-of-vehicle notification device which notifies a moving person in a vicinity of a host vehicle of information related to a behavior of the host vehicle based on a traveling plan of automatic driving while the host vehicle is being automatically driven. The out-of-vehicle notification device includes an outside situation detecting unit configured to detect a situation in the vicinity of the host vehicle, a moving person detecting unit configured to detect the moving person who is to be notified of the information related to the behavior of the host vehicle based on a result of detection performed by the outside situation detecting unit, an approaching vehicle detecting unit configured to detect an approaching vehicle approaching the moving person to be notified who is detected by the moving person detecting unit based on the result of detection performed by the outside situation detecting unit, a notification unit configured to perform notification of information with respect to an outside of the host vehicle, and a notification control unit configured to cause the notification unit to perform notification of vehicle stoppage information, which indicates that the host vehicle will be decelerated or stopped or indicates that the host vehicle is being decelerated or stopped, with respect to the moving person to be notified when the moving person to be notified is detected by the moving person detecting unit and the traveling plan is a traveling plan in which the host vehicle is decelerated or stopped. The notification control unit is configured not to cause the notification unit to perform the notification of the vehicle stoppage information when the approaching vehicle is detected by the approaching vehicle detecting unit.

When the approaching vehicle approaching the moving person to be notified is not detected, the out-of-vehicle notification device performs notification of the vehicle stoppage information with respect to the moving person to be notified. Accordingly, the moving person recognizes that the host vehicle has made way for the moving person due to the notification of the vehicle stoppage information and thus the moving person can take an action of crossing over a road or the like with an easy mind. In addition, when the approaching vehicle approaching the moving person to be notified is detected, the out-of-vehicle notification device does not perform the notification of the vehicle stoppage information with respect to the moving person to be notified. Accordingly, the moving person takes an action while sufficiently checking the vicinity of the moving person since there is no notification of the vehicle stoppage information. Therefore, the moving person can take an action while recognizing the approaching vehicle approaching the moving person in addition to the host vehicle. As described above, the out-of-vehicle notification device can appropriately perform notification of information related to the behavior of the host vehicle in consideration of the presence of another vehicle.

In the out-of-vehicle notification device, the notification control unit may be configured to stop the notification of the vehicle stoppage information and to cause the notification unit to perform notification of traveling information, which indicates that the host vehicle will continue to travel without being stopped or the host vehicle in a stopped state will start to move or indicates that the host vehicle is continuing to travel or the host vehicle in a stopped state is starting to move, when the approaching vehicle is detected by the approaching vehicle detecting unit while the notification of the vehicle stoppage information is being performed. In this case, the moving person can more reliably recognize that the situation has been changed from a state where the host vehicle has made way for the moving person based on the notification of the traveling information. In addition, moving person can change an action based on the change of notification. As described above, the out-of-vehicle notification device can more reliably notify the moving person that the situation has been changed.

In the out-of-vehicle notification device, the moving person detecting unit may be configured to detect a moving person expected to cross over a road in front of the host vehicle as the moving person to be notified. In this case, the out-of-vehicle notification device can perform the notification of the vehicle stoppage information with respect to the moving person expected to cross over the road in front of the host vehicle.

According to the aspect of the present disclosure, it is possible to appropriately perform notification of information related to the behavior of a host vehicle in consideration of the presence of another vehicle.

BRIEF DESCRIPTION OF THE DRAWINGS

FIG. 4 is a view illustrating a specific example of a situation in which the out-of-vehicle notification device performs notification.

FIG. 5 is a flowchart illustrating the flow of a notification process performed by the out-of-notification device.

DETAILED DESCRIPTION

Figure 1:
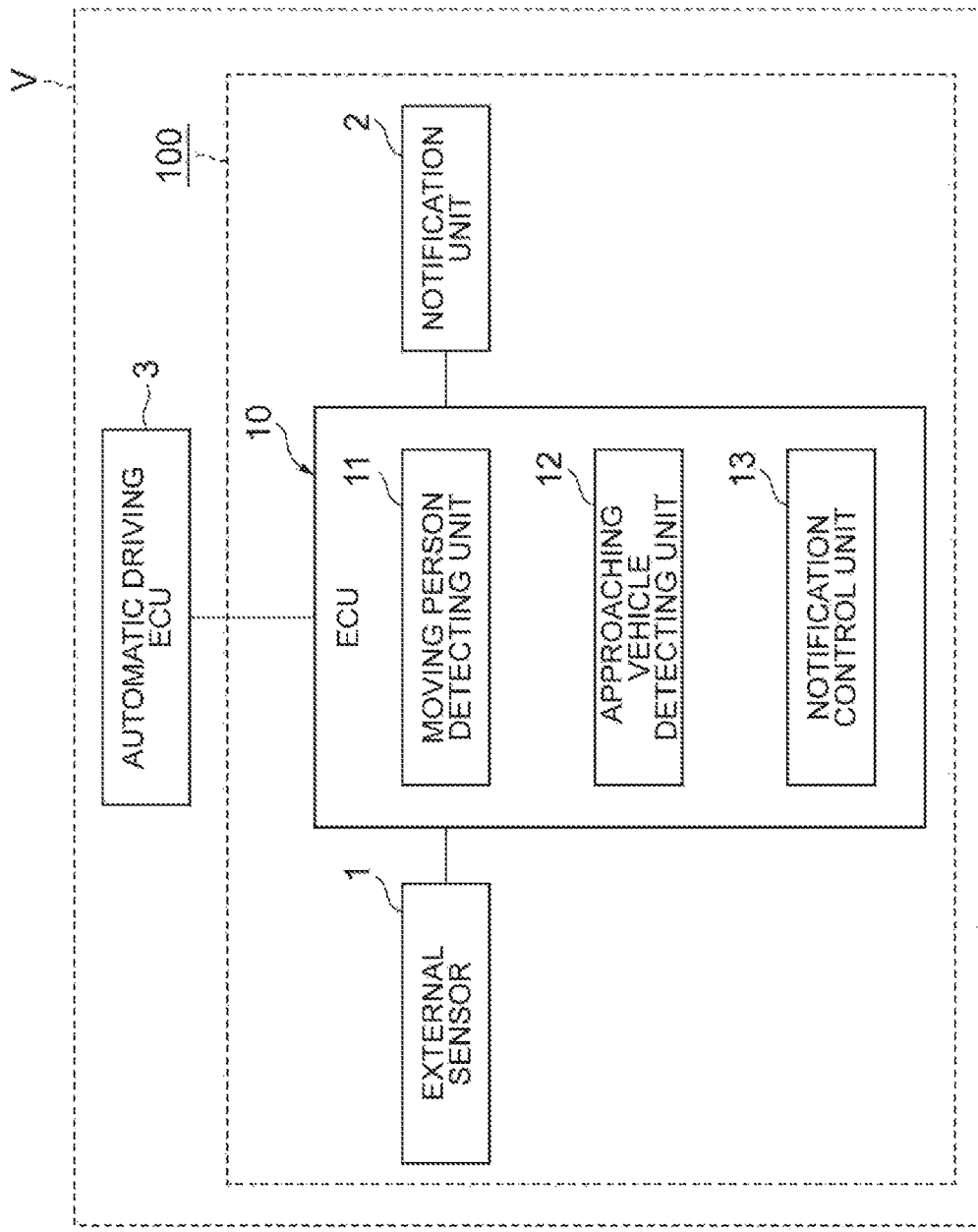
FIG. 1 is a block diagram illustrating an out-of-vehicle notification device according to an embodiment.

Hereinafter, an embodiment of the present disclosure will be described with reference to drawings. Note that, the same elements will be given the same reference numerals in the description of the drawings and description thereof will not be repeated.

As shown in FIG. 1, an out-of-vehicle notification device 100 is a device that is installed in a host vehicle V such as a passenger car that can be automatically driven, the device notifying a moving person in the vicinity of the host vehicle V of information related to the behavior of the host vehicle based on a traveling plan while the host vehicle V is being automatically driven. Automatic driving is vehicle control that causes the host vehicle V to automatically travel along a target route set in advance. In the case of the automatic driving, a driver does not need to perform a driving operation and the host vehicle V travels automatically. The moving person, who is a target to be notified of information, is a pedestrian in the vicinity of the host vehicle V, a person on a bicycle, or the like.

The out-of-vehicle notification device 100 is provided with an electronic control unit (ECU) 10 that controls the entire device, and an external sensor 1 and a notification unit 2 which are connected to the ECU 10. An automatic driving ECU 3 is further connected to the ECU 10. The ECU 10 is an electronic control unit including a central processing unit (CPU), a read only memory (ROM), a random access memory (RAM), a controller area network (CAN) communication circuit, and the like.

The ECU 10 is connected to, for example, a network that performs communication by using the CAN communication circuit and the ECU 10 is connected such that the ECU 10 can communicate with each component of the host vehicle V. That is, the ECU 10 can refer to the result of detection performed by the external sensor 1 and the traveling plan of the vehicle V which is generated in the automatic driving ECU 3. The ECU 10 can output a signal to the notification unit 2.

The ECU 10 loads a program stored in the ROM into the RAM and executes the program loaded in the RAM with the CPU so as to realize out-of-vehicle notification functions which will be described later. The ECU 10 may include a plurality of ECUs.

The external sensor (outside situation detecting unit) 1 is a detecting device that is installed in the host vehicle V and that detects a situation in the vicinity of the host vehicle V. The external sensor 1 includes at least one of a camera and a radar sensor.

The camera is an imaging device that images the outside situation in the vicinity of the host vehicle V. The camera is provided such that the camera can image the vicinity of the host vehicle V. The camera transmits imaging information related to the outside situation of the host vehicle V to the ECU 10. The camera may be a monocular camera and may be a stereo camera. The stereo camera includes two imaging units disposed such that the binocular parallax is realized. Imaging information of the stereo camera includes depth direction information also.

The radar sensor is a detecting device that detects an obstacle in the vicinity of the host vehicle V by using a radio wave (for example, millimeter wave) or light. Examples of the radar sensor include a millimeter wave radar and a light detection and ranging (LIDAR). The radar sensor detects an obstacle by transmitting a radio wave or light to the vicinity of the host vehicle V and receiving the radio wave or light reflected by the obstacle. The radar sensor transmits information about the detected obstacle to the ECU 10. Examples of the obstacle include a moving obstacle such as a pedestrian and a vehicle in addition to a fixed obstacle such as a guardrail and a building.

The notification unit 2 notifies a moving person on the outside of the host vehicle V of information related to the behavior of the host vehicle based on control performed by the ECU 10 (notification control unit 13). In the present embodiment, the notification unit 2 is a display device that displays information such that the information can be visually recognized from a position in front of the host vehicle V. The notification unit 2 is provided on the front surface of the host vehicle V, for example. The notification unit 2 shows information to the moving person by displaying a character, a picture, or the like.

The automatic driving ECU 3 executes automatic driving of the host vehicle V. The automatic driving ECU 3 is an electronic control unit including a CPU, a ROM, a RAM, a CAN communication circuit, and the like. The automatic driving ECU 3 is connected to a map data base storing map information, a position measuring unit that measures the position of the host vehicle V in a map with a global positioning system (GPS), various actuators for causing the host vehicle V to travel, and various sensors including the external sensor 1.

The automatic driving ECU 3 is connected to a network that performs communication by using, for example, the CAN communication circuit and is connected such that the automatic driving ECU 3 can communicate with each component of the host vehicle V. That is, the automatic driving ECU 3 can refer the map information of the map data base, information about the position of the host vehicle V in the map that is measured by the position measuring unit, and the result of detection performed by the various sensors. The ECU 10 can output signals to the various actuators.

The automatic driving ECU 3 loads a program stored in the ROM into the RAM and executes the program loaded in the RAM with the CPU so as to realize functions of an automatic driving system installed in the host vehicle V. The automatic driving ECU 3 may include a plurality of ECUs.

The map information of the map data base includes, for example, position information of a road (position information for each lane), information about the shape of a road (for example, information about type of curve or straight portion, curvature of curve, or like), information about the width of a road (information about width of lane), information about the slope of a road, information about the cant angle of a road, information about the speed limit for a road, and information about a road marking such as a crosswalk provided on a road. The various actuators include a steering actuator that controls the steering angle of the host vehicle V, a brake actuator that controls a brake system of the host vehicle V, and an engine actuator that controls an engine of the host vehicle V (or motor of electric car).

The automatic driving ECU 3 searches for a target route from the current position of the host vehicle V to a destination based on the map information of the map data base, the information about the position of the host vehicle V in the map that is measured by the position measuring unit, and a destination set in advance. The automatic driving ECU 3 generates a traveling plan for causing the host vehicle V to travel along the target route. That is, the automatic driving ECU 3 is provided with a traveling plan generating unit that generates the traveling plan. The traveling plan includes, for example, a moving route and a moving speed. The automatic driving ECU 3 generates the traveling plan of the host vehicle V by using a known method. The automatic driving ECU 3 executes automatic driving of the host vehicle V according to the traveling plan based on the information about the position of the host vehicle V in the map that is measured by the position measuring unit. In addition, the automatic driving ECU 3 transmits the generated traveling plan to the ECU 10. The automatic driving ECU 3 executes the automatic driving by controlling the host vehicle V by transmitting a control signal to the various actuators.

Here, the automatic driving ECU 3 generates the traveling plan according to a rule that the moving person is prior to the host vehicle V. Therefore, when there is a moving person who is about to cross over a road in front of the host vehicle V, the automatic driving ECU 3 generates a traveling plan in which the host vehicle V is decelerated or stopped to make way for the moving person expected to cross over the road and the host vehicle V starts to move after the moving person crosses over the road. Note that, the automatic driving ECU 3 can determine whether there is a moving person who is about to cross over the road in front of the host vehicle V based on the result of detection performed by the external sensor 1.

The ECU 10 includes a moving person detecting unit 11, an approaching vehicle detecting unit 12, and the notification control unit 13. Note that, a portion of the functions of the ECU 10 may be executed by a computer in a facility such as an information management center that can communicate with the host vehicle V and may be executed by a portable information terminal that can communicate with the host vehicle V.

The moving person detecting unit 11 detects a moving person in the vicinity of the host vehicle V based on the result of detection performed by the external sensor 1. The moving person detecting unit 11 can detect the moving person by using a known method based on the result of detection performed by the external sensor 1.

Furthermore, the moving person detecting unit 11 detects a moving person who is to be notified of information related to the behavior of the host vehicle V from among detected moving persons. In the present embodiment, the moving person detecting unit 11 detects a moving person expected to cross over a road in front of the host vehicle V as the moving person to be notified. The moving person detecting unit 11 can detect the moving person to be notified by using a known method based on the result of detection performed by the external sensor 1. For example, the moving person detecting unit 11 may determine whether a moving person is the moving person expected to cross over a road (moving person to be notified) or not based on a change in position of the moving person (vector).

The approaching vehicle detecting unit 12 detects an approaching vehicle that approaches the moving person to be notified who is detected by the moving person detecting unit 11 based on the result of detection performed by the external sensor 1. Note that, the approaching vehicle is a vehicle such as an automobile, a motorcycle, a bicycle, or the like, for example.

Specifically, first, the approaching vehicle detecting unit 12 detects other vehicles in the vicinity of the host vehicle V based on the result of detection performed by the external sensor 1. The approaching vehicle detecting unit 12 detects other vehicles present in a predetermined area around the host vehicle V as the other vehicles in the vicinity of the host vehicle V. The approaching vehicle detecting unit 12 can detect the other vehicles by using a known method based on the result of detection performed by the external sensor 1.

Next, the approaching vehicle detecting unit 12 determines whether other vehicles other than a preceding vehicle from among the detected other vehicles approach the moving person to be notified or not. The approaching vehicle detecting unit 12 detects another vehicle approaching the moving person to be notified from among the other vehicles other than the preceding vehicle as the approaching vehicle. Note that, the preceding vehicle refers to another vehicle traveling at a position in front of the host vehicle V while being separated from the host vehicle V by a distance equal to or smaller than a predetermined distance. That is, examples of the approaching vehicles do not include the preceding vehicle.

The approaching vehicle detecting unit 12 can determine whether another vehicle approaches the moving person to be notified or not by using a known method. For example, the approaching vehicle detecting unit 12 may determine whether the other vehicle approaches the moving person to be notified or not by expecting the behavior of the other vehicle based on a change (vector) in position of the detected other vehicle that is made in the past. For example, the approaching vehicle detecting unit 12 may determine whether the other vehicle approach the moving person or not by expecting the movement of the moving person and the movement of the other vehicle. In addition, the expression "approach" used here means approach in which a distance between the moving person and the other vehicle becomes equal to or smaller than a predetermined distance.

The notification control unit 13 performs notification of information related to the behavior of the host vehicle by controlling the notification unit 2. Specifically, when the moving person to be notified is detected by the moving person detecting unit 11 and the traveling plan generated in the automatic driving ECU 3 is a traveling plan in which the host vehicle V is decelerated or stopped, the notification control unit 13 causes the notification unit to perform notification of vehicle stoppage information, which indicates that the host vehicle will be decelerated or stopped or indicates that the host vehicle is being decelerated or stopped, with respect to the moving person to be notified. For example, the notification of the vehicle stoppage information may be an operation of displaying letters such as "vehicle will be decelerated", "vehicle will be stopped", "vehicle is being decelerated", "vehicle is being stopped", or the like on the notification unit 2. Alternatively, the notification of the vehicle stoppage information may be an operation of displaying an icon or the like suggesting that the host vehicle V will be decelerated or stopped or the host vehicle V is being decelerated or stopped on the notification unit 2. That is, the vehicle stoppage information is information including an intention of the host vehicle V to make way for the moving person.

In addition, even when the moving person to be notified is detected and the traveling plan is a traveling plan in which the host vehicle V is decelerated or stopped, the notification control unit 13 does not cause the notification unit 2 to perform notification of the vehicle stoppage information if the approaching vehicle is detected by the approaching vehicle detecting unit 12. Note that, the notification control unit 13 stops notification of the vehicle stoppage information performed by the notification unit 2 if the notification of the vehicle stoppage information performed by the notification unit 2 is in progress.

Furthermore, when the approaching vehicle is detected by the approaching vehicle detecting unit 12 while the notification of the vehicle stoppage information is being performed, the notification control unit 13 stops the notification of the vehicle stoppage information and causes the notification unit 2 to perform notification of traveling information, which indicates that the host vehicle V will continue to travel without being stopped or the host vehicle V in a stopped state will start to move or indicates that the host vehicle V is continuing to travel or the host vehicle V in a stopped state is starting to move. That is, the notification control unit 13 switches from the notification of the vehicle stoppage information to the notification of the traveling information. For example, the notification of the traveling information may be an operation of displaying letters such as "vehicle will pass without being stopped", "vehicle will start to move", "vehicle is passing without being stopped", "vehicle is starting to move", or the like on the notification unit 2. Alternatively, the notification of the traveling information may be an operation of displaying an icon or the like suggesting that the host vehicle V will continue to travel without being stopped, that the host vehicle V in a stopped state will start to move, that the host vehicle V is passing without being stopped, or that the host vehicle V is starting to move on the notification unit 2. As described above, the traveling information is information including an intention of the host vehicle V not to make way for the moving person. That is, the traveling information is information including an intention to hold the moving person who is about to cross over a road such that the moving person does not cross over the road.

In addition, when the moving person to be notified is detected, the traveling plan is a traveling plan in which the host vehicle V is decelerated or stopped, and the approaching vehicle is detected by the approaching vehicle detecting unit 12, the notification control unit 13 causes the notification unit 2 to perform the notification of the traveling information. That is, the notification control unit 13 also can perform the notification of the traveling information from the beginning although depending on the timing of detection of the approaching vehicle instead of performing the change from the vehicle stoppage information to the traveling information in the middle of the notification of the vehicle stoppage information.

Note that, when the preceding vehicle is detected by the approaching vehicle detecting unit 12, the notification control unit 13 does not perform the notification of the vehicle passage information and the traveling information. That is, the notification control unit 13 performs the notification of the vehicle passage information and the traveling information based on the presence or absence of the approaching vehicle or the like when there is no preceding vehicle.

In addition, even when the notification control unit 13 performs the notification of the traveling information due to the presence of the approaching vehicle, the automatic driving ECU 3 stops the host vehicle V until the moving person crosses over the road.

Next, a specific example of a situation in which the out-of-vehicle notification device 100 performs notification will be described with reference to FIGS. 2 to 4. Here, the description will be made on an assumption that the moving person is a pedestrian. In an example shown in FIGS. 2 to 4, a pedestrian crossing K is provided on a road R on which the host vehicle V travels and a pedestrian P is about to cross over the road R by passing through the pedestrian crossing K. In addition, since the pedestrian P is about to pass through the pedestrian crossing K, the automatic driving ECU 3 has stopped the host vehicle V in front of the pedestrian crossing K. In addition, the notification control unit 13 is in the middle of the notification of the vehicle stoppage information which is notification indicating an intention to make way for the pedestrian P.

Figure 2:
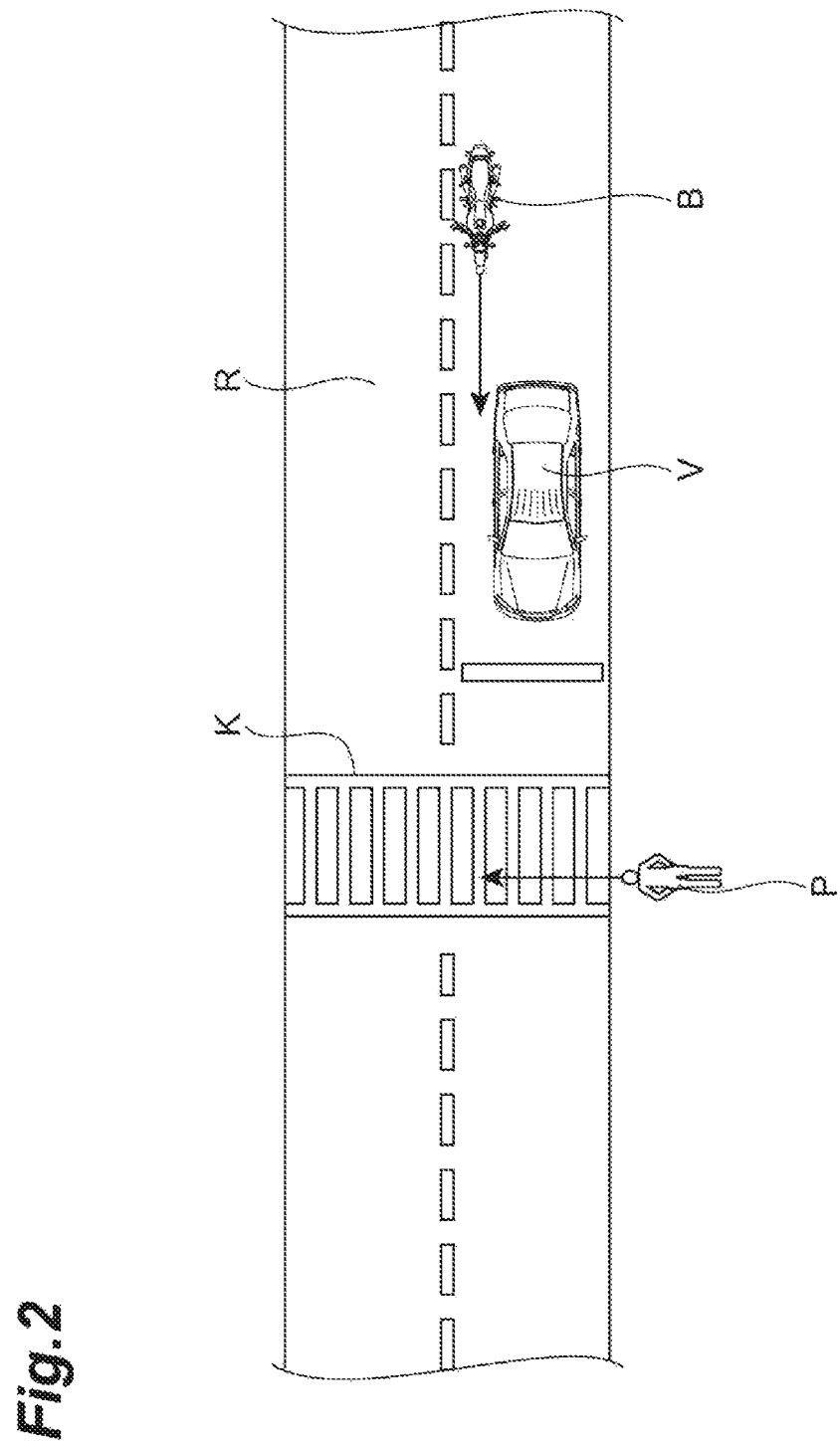
FIG. 2 is a view illustrating a specific example of a situation in which an out-of-vehicle notification device performs notification.

An example shown in FIG. 2 is related to a case where a motorcycle B approaches the pedestrian P from a position behind the host vehicle V as seen from the pedestrian P. That is, the motorcycle B is the approaching vehicle approaching the pedestrian P. When the out-of-vehicle notification device 100 performs the notification of the vehicle stoppage information in this situation, the pedestrian P may recognize that the host vehicle V has made way for the pedestrian P and may try to pass through the pedestrian crossing K without sufficiently checking the situation around the pedestrian P. Therefore, when the motorcycle B approaching the pedestrian P from a position behind the host vehicle V is detected by the external sensor 1, the out-of-vehicle notification device 100 notifies the pedestrian P of the notification of the traveling information so as to hold the pedestrian P such that the pedestrian P does not pass through the pedestrian crossing K. That is, when the motorcycle B is detected, the out-of-vehicle notification device 100 stops the notification of the vehicle stoppage information and performs the notification of the traveling information.

Figure 3:
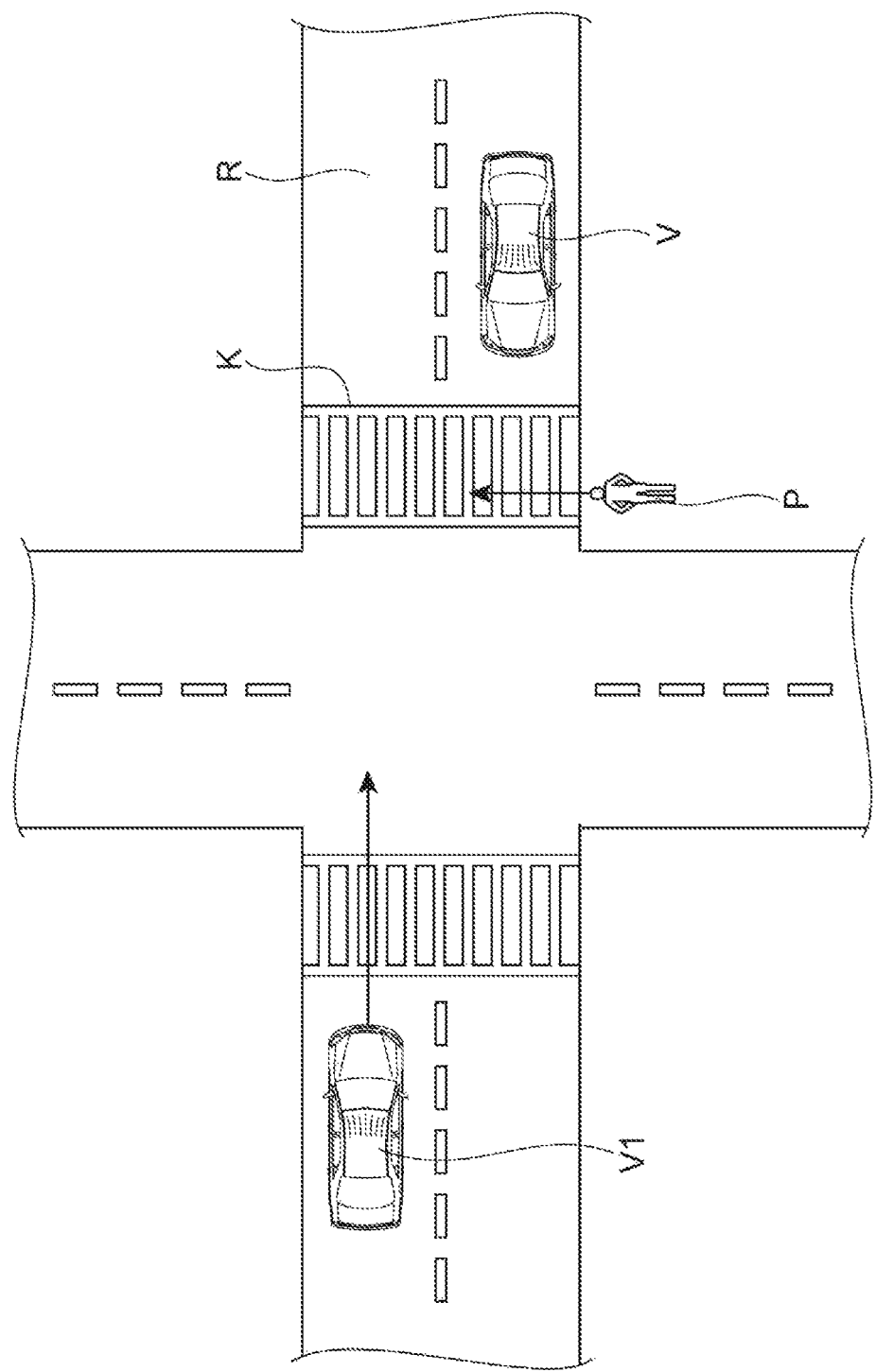
FIG. 3 is a view illustrating a specific example of a situation in which the out-of-vehicle notification device performs notification.

An example shown in FIG. 3 is related to a case where another vehicle V1 that travels on an opposing lane at a position in front of the host vehicle V approaches the pedestrian P. That is, the other vehicle V1 is the approaching vehicle approaching the pedestrian P. In this situation, the pedestrian P can easily visually recognize the other vehicle V1 in comparison with a case where the motorcycle B approaches the pedestrian P from a position behind the host vehicle V as shown in FIG. 2. However, when the out-of-vehicle notification device 100 performs the notification of the vehicle stoppage information, the pedestrian P may try to pass through the pedestrian crossing K without sufficiently checking the situation around the pedestrian P. Therefore, when the other vehicle V1 approaching the pedestrian P is detected by the external sensor 1, the out-of-vehicle notification device 100 notifies the pedestrian P of the notification of the traveling information so as to hold the pedestrian P such that the pedestrian P does not pass through the pedestrian crossing K. That is, when the other vehicle V1 is detected, the out-of-vehicle notification device 100 stops the notification of the vehicle stoppage information and performs the notification of the traveling information.

An example shown in FIG. 4 is related to a case where the other vehicle V1 that is in front of and to the right of the host vehicle V turns left and approaches the pedestrian P. That is, the other vehicle V1 is the approaching vehicle approaching the pedestrian P. In this situation, the pedestrian P can easily visually recognize the other vehicle V1 since the other vehicle V1 is present in front of the pedestrian P. However, when the out-of-vehicle notification device 100 performs the notification of the vehicle stoppage information, the pedestrian P may try to pass through the pedestrian crossing K without sufficiently checking the situation around the pedestrian P. Therefore, when the other vehicle V1 approaching the pedestrian P from a position that is in front of and to the right of the host vehicle V is detected by the external sensor 1, the out-of-vehicle notification device 100 notifies the pedestrian P of the notification of the traveling information so as to hold the pedestrian P such that the pedestrian P does not pass through the pedestrian crossing K. That is, when the other vehicle V1 is detected, the out-of-vehicle notification device 100 stops the notification of the vehicle stoppage information and performs the notification of the traveling information.

Next, the flow of a notification process performed by the out-of-vehicle notification device 100 will be described by using a flowchart in FIG. 5. Note that, the process shown in FIG. 5 is restarted from the start when a predetermined time elapses after the process reaches the end. In addition, the process shown in FIG. 5 is executed while the host vehicle V is being automatically driven.

As shown in FIG. 5, the moving person detecting unit 11 detects a moving person in the vicinity of the host vehicle V based on the result of detection performed by the external sensor 1 (S101). The moving person detecting unit 11 determines whether there is a moving person to be notified who is about to cross over a road in front of the host vehicle V based on the result of the detection performed by the external sensor 1 (S102). When there is no moving person to be notified (S102: NO), the out-of-vehicle notification device 100 terminates the current process and restarts the process from the start after the predetermined time elapses.

When there is a moving person to be notified (S102: YES), the approaching vehicle detecting unit 12 detects another vehicle in the vicinity of the host vehicle V (S103). The approaching vehicle detecting unit 12 determines whether there is a preceding vehicle (S104). When there is a preceding vehicle (S104: NO), the out-of-vehicle notification device 100 terminates the current process and restarts the process from the start after the predetermined time elapses.

When there is no preceding vehicle (S104: YES), the notification control unit 13 determines whether the traveling plan generated by the automatic driving ECU 3 is a traveling plan in which the host vehicle V is decelerated or stopped or not (S105). That is, the notification control unit 13 determines whether the traveling plan is a traveling plan of making way for the pedestrian expected to cross over a road. When the traveling plan is not a traveling plan in which the host vehicle V is decelerated or stopped, (S105: NO), the out-of-vehicle notification device 100 terminates the current process and restarts the process from the start after the predetermined time elapses.

When the traveling plan is a traveling plan in which the host vehicle V is decelerated or stopped (S105: YES), the approaching vehicle detecting unit 12 determines whether there is another vehicle other than the preceding vehicle (S106). When there is no other vehicle other than the preceding vehicle (S106: NO), the notification control unit 13 causes the notification unit 2 to perform the notification of the vehicle stoppage information (S110).

When there is another vehicle other than the preceding vehicle (S106: YES), the approaching vehicle detecting unit 12 performs a process of detecting whether the other vehicle other than the preceding vehicle approaches the moving person to be notified (S107). When there is an approaching vehicle approaching the moving person to be notified (S108: YES), the notification control unit 13 causes the notification unit 2 to perform the notification of the traveling information (S109). Note that, if the notification unit 2 is caused to perform the notification of the vehicle stoppage information in a preceding process, the notification control unit 13 stops the notification of the vehicle stoppage information and causes the notification unit 2 to perform the notification of the traveling information when performing the process in S109. That is, the notification control unit 13 switches from the notification of the vehicle stoppage information to the notification of the traveling information.

Meanwhile, when there is no approaching vehicle approaching the moving person to be notified (S108: NO), the notification control unit 13 causes the notification unit 2 to perform the notification of the vehicle stoppage information (S110).

As described above, when an approaching vehicle approaching the moving person to be notified is not detected, the out-of-vehicle notification device 100 performs notification of the vehicle stoppage information with respect to the moving person to be notified. Accordingly, the moving person recognizes that the host vehicle V has made way for the moving person due to the notification of the vehicle stoppage information and thus the moving person can take an action of crossing over a road or the like with an easy mind. In addition, when an approaching vehicle approaching the moving person to be notified is detected, the out-of-vehicle notification device 100 does not perform the notification of the vehicle stoppage information with respect to the moving person to be notified. Accordingly, the moving person takes an action while sufficiently checking the vicinity of the moving person since there is no notification of the vehicle stoppage information. Therefore, the moving person can take an action while recognizing the approaching vehicle approaching the moving person in addition to the host vehicle V. As described above, the out-of-vehicle notification device 100 can appropriately perform notification of information related to the behavior of the host vehicle V in consideration of the presence of another vehicle.

When an approaching vehicle approaching the moving person is detected while the notification of the vehicle stoppage information is being performed, the out-of-vehicle notification device 100 stops the notification of the vehicle stoppage information and causes the notification unit 2 to perform the notification of the traveling information. In this case, the moving person can more reliably recognize that the situation has been changed from a state where the host vehicle V has made way for the moving person due to the switch from the notification of the vehicle stoppage information to the notification of the traveling information. In addition, the moving person can change an action based on the change of notification. As described above, the out-of-vehicle notification device 100 can more reliably notify the moving person that the situation has been changed.

The moving person detecting unit 11 detects a moving person expected to cross over a road in front of the host vehicle V as the moving person to be notified. In this case, the out-of-vehicle notification device 100 can perform the notification of the vehicle stoppage information with respect to the moving person expected to cross over the road in front of the host vehicle V.

Hereinabove, the embodiment of the present disclosure has been described. However, the present disclosure is not limited to the above-described embodiment. For example, the notification unit 2 may be a speaker that outputs sound. The notification control unit 13 may perform the notification of the vehicle stoppage information and the traveling information by outputting a voice such as "vehicle will be stopped" and "vehicle will start to move", a buzzer sound, or the like from the notification unit 2. In addition, the notification unit 2 may be a mobile device carried by the moving person. For example, the notification control unit 13 may perform the notification of the vehicle stoppage information and the traveling information by causing a vibration generating unit of the mobile device carried by the moving person to vibrate. In addition, the notification control unit 13 may perform the notification of the vehicle stoppage information and the traveling information by using a change in behavior of the host vehicle V.

Note that, the out-of-vehicle notification device 100 may perform the notification of the vehicle stoppage information only without performing the notification of the traveling information. In addition, the moving person detecting unit 11 may detect a moving person other than a moving person expected to cross over a road in front of the host vehicle V as the moving person to be notified. For example, the moving person detecting unit 11 may detect a moving person moving in a predetermined area around the host vehicle V as the moving person to be notified. For example, the approaching vehicle detecting unit 12 may detect another vehicle traveling in a predetermined area from the moving person to be notified as an approaching vehicle.

What is claimed is:

1. An out-of-vehicle notification device of an automatically driven vehicle that travels according to a traveling plan, comprising:
    an external sensor that detects a situation in an outside vicinity of the automatically driven vehicle;
    a notification unit that notifies a person in the outside vicinity of the automatically driven vehicle of information related to a behavior of the automatically driven vehicle based on a traveling plan of the automatically driven vehicle;
    an electric control unit programmed to:
    detect presence of the person in the outside vicinity of the automatically driven vehicle that should be notified of the information related to the behavior of the automatically driven vehicle based on a detection result of the external sensor;
    detect, using the external sensor, whether another vehicle is present in the outside vicinity of the automatically driven vehicle and, when the another vehicle is present, whether the another vehicle is approaching the person in the outside vicinity of the automatically driven vehicle;
    based upon a detection result that the another vehicle is not present in the outside vicinity of the automatically driven vehicle, cause the notification unit to notify vehicle stoppage information to the person in the outside vicinity of the automatically driven vehicle, wherein the vehicle stoppage information includes that the automatically driven vehicle will be decelerated or stopped or that the automatically driven vehicle is being decelerated or stopped,
    based upon the detection result that the another vehicle is present in the outside vicinity of the automatically driven vehicle and that the another vehicle is not approaching the person in the outside vicinity of the automatically driven vehicle, cause the notification unit to notify the vehicle stoppage information to the person in the outside vicinity of the automatically driven vehicle,
    based upon the detection result that the another vehicle is present in the outside vicinity of the automatically driven vehicle and that the another vehicle is approaching the person in the outside vicinity of the automatically driven vehicle, cause the notification unit to notify the travel plan of the automatically driven vehicle without including the vehicle stoppage information.

2. The out-of-vehicle notification device according to claim 1, wherein based upon the detection result that the another vehicle is present in the outside vicinity of the automatically driven vehicle and that the another vehicle is approaching the person in the outside vicinity of the automatically driven vehicle, while the notification unit is notifying the person in the vicinity of the automatically driven vehicle of the vehicle stoppage information, the electronic control unit is programmed to stop the notification of the vehicle stoppage information and to cause the notification unit to perform notification of traveling information, which indicates that the automatically driven vehicle will continue to travel without being stopped or the automatically driven vehicle in a stopped state will start to move or indicates that the automatically driven vehicle is continuing to travel or the automatically driven vehicle in a stopped state is starting to move.

3. The out-of-vehicle notification device according to claim 1,
    wherein the external sensor is configured to determine whether the person in the vicinity of the automatically driven vehicle is expected to cross over a road in front of the automatically driven vehicle, and based upon a determination that the person is not expected to cross over the road in front of the automatically driven vehicle, the electronic control unit is further programmed to not cause the notification unit to notify information to the person.

4. The out-of-vehicle notification device according to claim 1, wherein the notification device is a visual display device or an audio device.

* * * * *